(12) United States Patent
Hu et al.

(10) Patent No.: US 11,774,843 B2
(45) Date of Patent: Oct. 3, 2023

(54) LIGHT SOURCE SYSTEM AND DISPLAY DEVICE

(71) Applicant: APPOTRONICS CORPORATION LIMITED, Guangdong (CN)

(72) Inventors: Fei Hu, Shenzhen (CN); Zuqiang Guo, Shenzhen (CN); Ning Lu, Shenzhen (CN); Yi Li, Shenzhen (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 151 days.

(21) Appl. No.: 17/604,393

(22) PCT Filed: Apr. 23, 2020

(86) PCT No.: PCT/CN2020/086236
§ 371 (c)(1),
(2) Date: Oct. 15, 2021

(87) PCT Pub. No.: WO2020/216263
PCT Pub. Date: Oct. 29, 2020

(65) Prior Publication Data
US 2022/0197126 A1    Jun. 23, 2022

(30) Foreign Application Priority Data

Apr. 24, 2019 (CN) .......................... 201910334458.3

(51) Int. Cl.
*G03B 33/08* (2006.01)
*G03B 21/20* (2006.01)
*G03B 21/00* (2006.01)

(52) U.S. Cl.
CPC ........... *G03B 33/08* (2013.01); *G03B 21/008* (2013.01); *G03B 21/204* (2013.01); *G03B 21/208* (2013.01)

(58) Field of Classification Search
None
See application file for complete search history.

(56) References Cited

U.S. PATENT DOCUMENTS

2019/0353995 A1* 11/2019 Pan ...................... H04N 9/3155

FOREIGN PATENT DOCUMENTS

| CN | 103676428 | 3/2014 |
| CN | 104932183 | 9/2015 |

(Continued)

OTHER PUBLICATIONS

International Search Report for International Application PCT/CN2020/086236, dated Jul. 8, 2020.

*Primary Examiner* — Bao-Luan Q Le
*Assistant Examiner* — Danell L Owens (57) ABSTRACT

Disclosed are a light source system and a display device, including: a first light source configured to emit first light; a second light source configured to emit second light; a wavelength conversion device configured to perform a wavelength conversion on the first light to obtain third light; a first optical splitter having a first area and a second area; and a first light combining device. The first optical splitter moves in timing sequence to make the first area and the second area be sequentially located on a preset light path. A side surface of the first optical splitter is configured to homogenize the first light and the second light that are emitted to the first light combining device; and the first light combining device is configured to guide the first light, the second light, and the third light to exit along a same light path to form illumination light.

14 Claims, 9 Drawing Sheets

(56) References Cited

FOREIGN PATENT DOCUMENTS

| | | |
|---|---|---|
| CN | 106125475 | 11/2016 |
| CN | 106291965 | 1/2017 |
| CN | 107315311 | 11/2017 |
| CN | 208188567 | 12/2018 |
| WO | 2014192115 | 12/2014 |

* cited by examiner

LIGHT SOURCE SYSTEM AND DISPLAY DEVICE

CROSS-REFERENCE TO RELATED APPLICATIONS

This application is a national phase of International Application No. PCT/CN2020/086236, filed on Apr. 23, 2020, which claims priority to and the benefit of CN 201910334458.3, filed on Apr. 24, 2019. The disclosures of the above applications are incorporated herein by reference.

FIELD

The present disclosure relates to the technical field of display, and in particular, to a light source system and a display device.

BACKGROUND

The statements in this section merely provide background information related to the present disclosure and may not constitute prior art.

For a two-chip DMD projection system that uses a laser-phosphor hybrid light source, the light source usually presents two colors, blue and yellow, alternately in time sequence. In traditional technology, a blue laser is usually used to illuminate a color wheel, and the color wheel is provided thereon with a yellow phosphor area and a scattering area. When the color wheel rotates, the blue laser excites yellow fluorescence in the yellow phosphor area, and transmits through the scattering area. When the blue laser transmits through the wavelength conversion device and exits, the wavelength device may cause optical loss. Since the blue laser should pass through a plurality of optical component, luminous efficacy of the blue light would be jeopardized. After the yellow light enters the optical-mechanical system, the yellow light is split into red light and green light, which enter two DMDs respectively to be processed simultaneously. The blue light is modulated using a corresponding DMD according to actual requirements of the product.

The yellow fluorescence that is produced by laser exciting phosphor has a high utilization. However, as the utilization of yellow light increases, for a white light with identical chromaticity coordinate, the blue light required increases, thereby causing a problem of insufficient blue light.

SUMMARY

This section provides a general summary of the disclosure and is not a comprehensive disclosure of its full scope or all of its features.

According to a first aspect of the present disclosure, a light source system is provided, including:
 a first light source configured to emit first light;
 a second light source configured to emit second light;
 a wavelength conversion device configured to perform a wavelength conversion on the first light to obtain third light;
 a first optical splitter having a first area and a second area, the first optical splitter moving in timing sequence to make the first area and the second area be sequentially located on a preset light path, the first area being configured to guide the first light to the wavelength conversion device and guide the second light to a first light combining device, the second area being configured to guide the first light to the first light combining device, and a side surface of the first optical splitter being configured to homogenize the first light and the second light that are emitted to the first light combining device; and
 the first light combining device configured to guide the first light emitted from the second area, the second light emitted from the first area, and the third light emitted from the wavelength conversion device to exit along a same light path to form illumination light.

According to a second aspect of the present disclosure, a display device is provided, including the above-mentioned light source system.

Further areas of applicability will become apparent from the description provided herein. It should be understood that the description and specific examples are intended for purposes of illustration only and are not intended to limit the scope of the present disclosure.

DRAWINGS

In order to better illustrate the technical solutions in embodiments of the present disclosure, the drawings used in the description of embodiments will be briefly described below. Apparently, the drawings as described below are only some embodiments of the present disclosure, and those skilled in the art, without creative effort, may obtain other drawings based on these drawings, in which.

| Reference signs of the main elements are described as follows: | |
| --- | --- |
| yellow fluorescent | a |
| red fluorescent | b |
| green fluorescence | c |
| display device | 10 |
| light source system | 100, 200, 300, 400, 500, 600 |
| first light source | 111 |
| second light source | 112 |
| first splitter | 120, 120A |
| first surface | 120a |
| second surface | 120b |
| first area | 121 |
| second area | 122 |
| anti-reflection film | 124a, 124b, 124c, 134a, 134b |
| high-reflection film | 123, 133a, 133b, |
| light splitting film | 125, 135 |
| relay lens | 211, 212, 213, 161 |
| first light combining device | 130 |
| intermediate image | A |
| dividing line | A1, A2 |
| area without fluorescence | S1 |
| third surface | 130a |
| fourth surface | 130b |
| third area | 131 |
| fourth area | 132 |
| light homogenizing element | 220 |
| reflective element | 231 |
| dichroic filter | 140, 141 |
| wavelength conversion device | 150 |
| light collection assembly | 151 |
| light homogenizing component | 160 |
| fly-eye | 162 |
| lens group | 163 |
| optical bar | 164 |
| polarization device | 170 |
| second splitter | 180 |
| first light modulation device | 191 |
| second light modulation device | 192 |
| second light combining device | 181 |
| projection lens | 800 |

The present disclosure will be further described in the following description of embodiments in combination of the above figures. The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In order to better illustrate the above objectives, features and advantages of the present disclosure, the present disclosure will be described in detail below with reference to the accompanying drawings and specific embodiments. It should be noted that the embodiments of the application and the features in the embodiments can be combined with each other if there is no conflict.

In the following description, various specific details are set forth in order to better illustrate the present disclosure, and the described embodiments are merely some embodiments rather than all embodiments of the present disclosure. Based on the embodiments of the present disclosure, all other embodiments obtained by those ordinary skilled in the art without creative work shall fall within the protection scope of the present disclosure.

Unless otherwise defined, all technical and scientific terms used herein have the same meaning as commonly understood by those skilled in the art. The terms used in the description of the present disclosure herein are only for a purpose of describing the detailed embodiments, but are not intended to limit the present disclosure.

In the light source system according to the present disclosure, first light emitted by a first light source is converted into third light after passing a wavelength conversion device, then the third light and second light emitted by a second light source are combined on a first light combining device, thereby being beneficial to correction of a color purity and a proportion of each primary color light contained in illumination light, and the second light emitted by the second light source is beneficial to expansion of the color gamut range of the illumination light. The second light enters a first optical splitter that is the same as that the first light enters, for light guidance and homogenization, so that the light path is more compact and optical components of the light source system are as few as possible. A display device according to the present disclosure may be a projection display device, such as an engineering projector, a cinema projector, etc., and the light source system according to the present disclosure can be applied to the above-mentioned display device.

Figure 1:
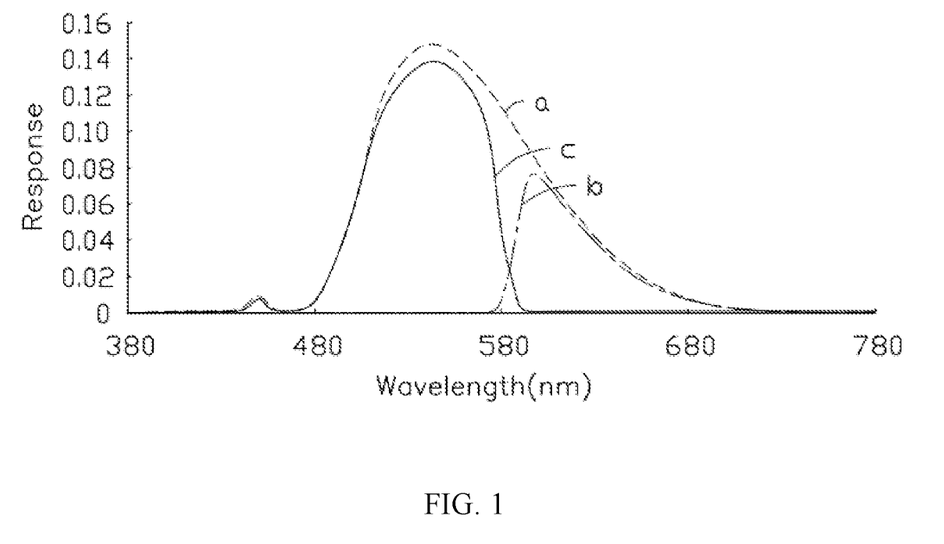
FIG. 1 is a curve of a yellow fluorescence spectrum.

In the yellow fluorescence spectrum shown in FIG. 1, after splitting the yellow fluorescence a, the green fluorescence c obtained is less than the red fluorescence b. When the white light is matched, in order to ensure the white light chromaticity coordinate, excess green fluorescence shall be filtered out, which results in a reduced luminous efficacy of the yellow fluorescence. In addition, due to the wide fluorescence spectrum, color purity of the red fluorescence and the green fluorescence obtained by splitting the yellow fluorescence is low, and the color gamut range of projection display is small, which is not suitable for applications with high requirements for the color gamut, such as a laser TV and a digital cinema.

First Embodiment

Figure 2:
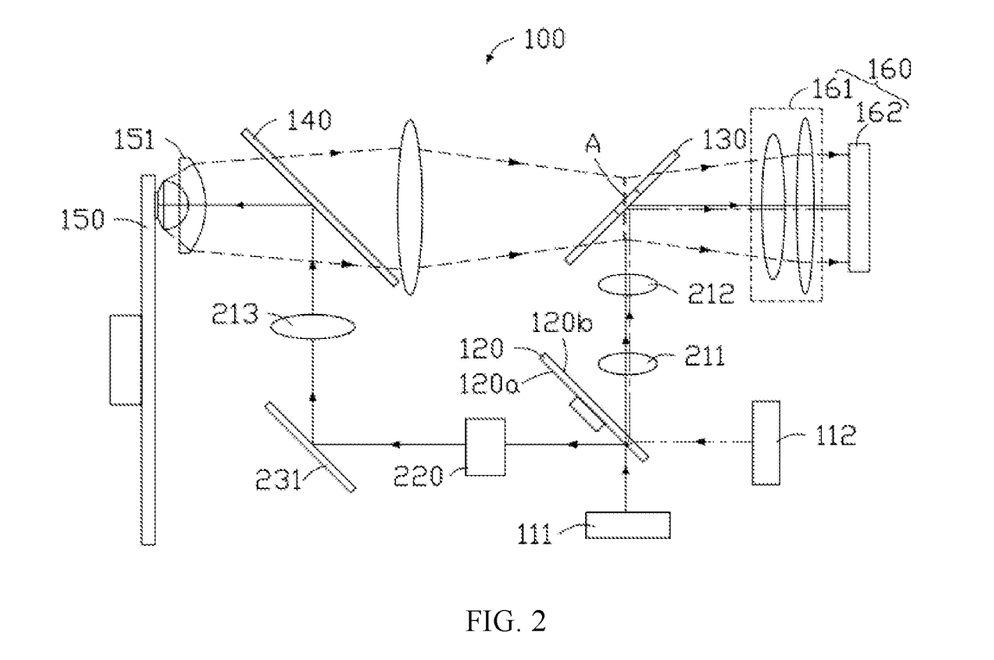
FIG. 2 is a schematic structure diagram of a light source system according to a first embodiment of the present disclosure.

Referring to FIG. 2, a light source system 100 according to the first embodiment of the present disclosure includes a first light source 111, a second light source 112, a wavelength conversion device 150 and a first optical splitter 120. The first light source 111 is configured to emit first light; the second light source 112 is configured to emit second light; the wavelength conversion device 150 is configured to perform a wavelength conversion on the first light and obtain third light. A wavelength range of the third light is wider than a wavelength range of the second light. The first optical splitter 120 is configured to split the first light in timing sequence emitted by the first light source 111, and to guide the second light and a part of the first light to exit along a same light path.

In this embodiment, the first light source 111 is a blue laser light source emitting blue laser light as the first light, and the first light is converged by a light-converging lens and is then incident to the first optical splitter 120; the second light source 112 includes a red laser device and a green laser device, which emit a red laser and a green laser, respectively, the red laser and the green laser are combined to obtain a yellow laser as the second light, and the second light is converged by a light-converging lens and is then incident to the first optical splitter 120. In other embodiments, the types of the first light source 111 and the second light source 112 are not limited to laser light sources, and the first light source 111 and the second light source 112 may also be light-emitting diode light sources, arc light sources, and the like. In other embodiments, the second light source 112 may emit only red light or only green light, which can correct a proportion of the red light or green light in the illumination light; the color of the first light source 111 is not limited to blue, and the color of the laser in the second light source 112 is not limited to red and green, and the first light source 111 and the second light source 112 may also emit orange light, purple light, yellow light and light of other colors. It can be understood that the color and number of laser devices in the first light source 111 and the second light source 112 may be adjusted according to actual requirements. The first light source 111 and the second light source 112 are arranged at two sides of the first optical splitter 120, respectively. The first optical splitter 120 includes a first surface 120a and a second surface 120b that are opposite to each other. Specifically, in this embodiment, the first surface 120a is a polished surface, and the second surface 120b is a scattering surface, which can homogenize the first and second lights incident onto this surface. The first optical splitter 120 has at least a first area 121 and a second area 122, which are located on a preset light path sequentially and respectively. The first area 121 is configured to reflect the first light to the wavelength conversion device 150 and reflect the second light, and the second area 122 is configured to transmit the first light, so that the first light that passes through the second area 122 and the second light reflected by the first area 121 exit along a same light path, to form the illumination light.

Figure 3:
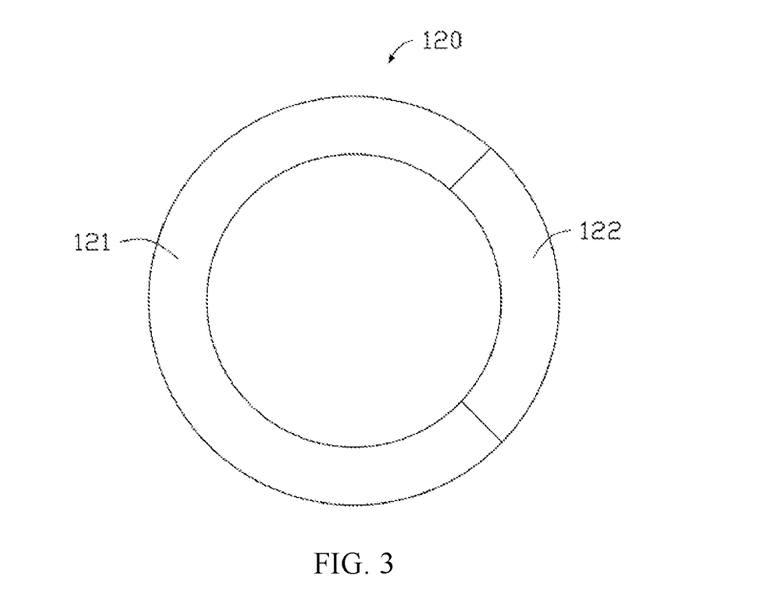
FIG. 3 is a schematic structure diagram of a first optical splitter in the light source system according to the first embodiment of the present disclosure.
Figure 4:
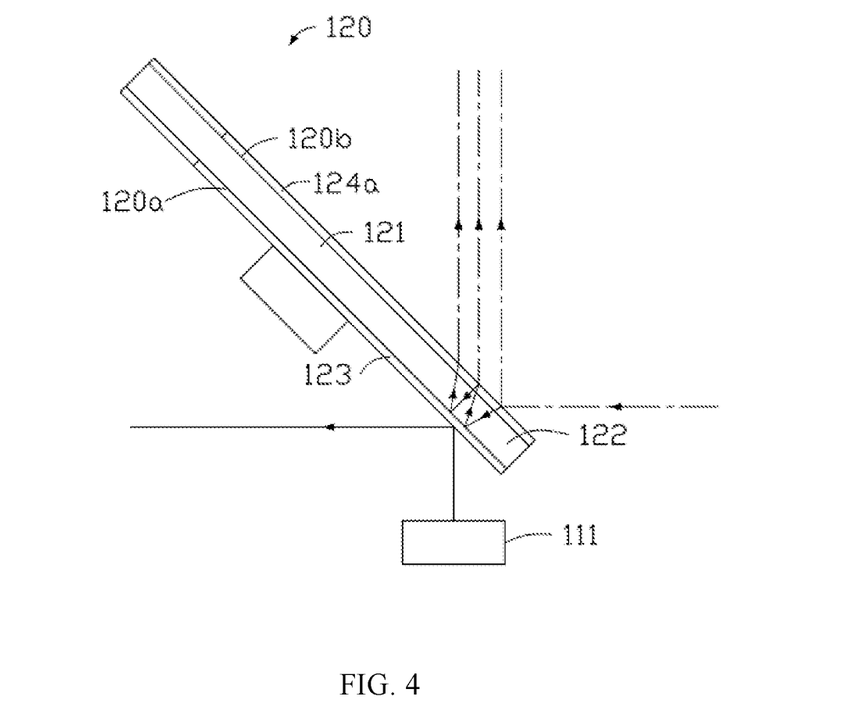
FIG. 4 is a schematic diagram of a light path when a first area of the first optical splitter in the light source system according to the first embodiment of the present disclosure moves to a preset light path.
Figure 5:
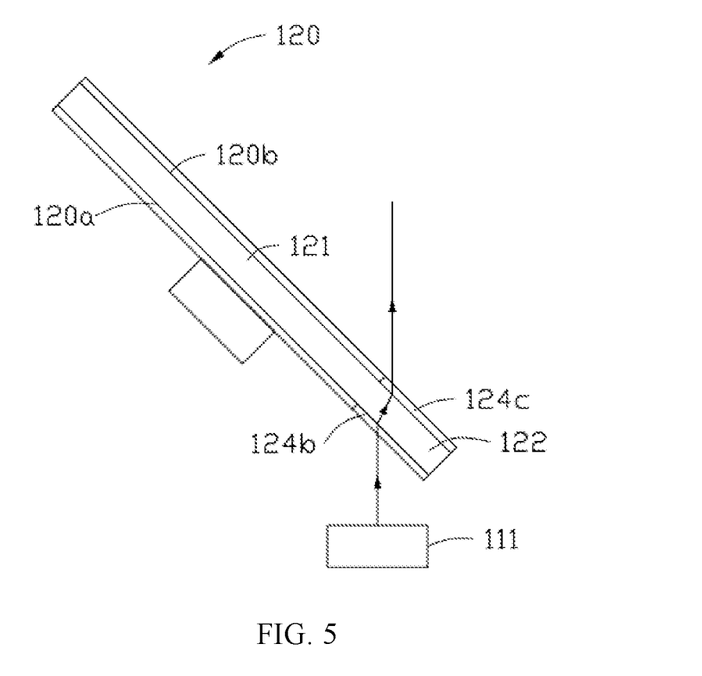
FIG. 5 is a schematic diagram of a light path when a second area of the first optical splitter in the light source system according to the first embodiment of the present disclosure moves to a preset light path.

Referring to FIG. 3, in this embodiment, the first optical splitter 120 includes a disc, which is provided with the first area 121 and the second area 122. In this embodiment, the first optical splitter 120 further includes a first driving unit for driving the disc to rotate periodically, so that the first area 121 and the second area 122 are located on the light paths of the first and second lights in timing sequence. In other embodiments, the first optical splitter 120 may be, for example, a plate structure, and the first driving unit controls an inclination angle of the first optical splitter 120 so that the first light and the second light are incident onto different areas of the first optical splitter 120 to achieve splitting of light; the first optical splitter 120 may be also, for example, a grating structure. Specifically, referring to FIGS. 4 and 5, the first surface 120a in the first area 121 is coated with a high-reflection film 123, the second surface 120b in the first area 121 is coated with an anti-reflection film 124a, and the first surface 120a and the second surface 120b in the second area 122 are coated with an anti-reflection film 124b and an anti-reflection film 124c respectively. Referring to FIG. 4, when the first area 121 rotates to the light paths of the first light and the second light, the first light emitted by the first light source 111 is reflected to the wavelength conversion device 150 by the high-reflection film 123 on the first surface 120a in the first area 121 to excite and generate the third light, and the second light emitted by the second light source 112 is incident from the second surface 120b in the first area 121, and is reflected by the high-reflection film 123 on the first surface 120a in the first area 121, and then exits from the second surface 120b in the first area 121. Referring to FIG. 5, when the second area 122 rotates to the light path of the first light, the first light emitted by the first light source 111 passes through the anti-reflection film 124b, the first surface 120a, the second surface 120b and the anti-reflection film 124c in the second area 122 successively, and then exits in the same light path as that the second light emitted from the second surface 120b in the first area 121 exits, and the second light source does not emit light.

In another embodiment, the first optical splitter 120 includes a disc, which is provided with the first area 121 and the second area 122. The first surface 120a in the first area 121 is provided with a reflective layer, and the second surface 120b in the first area 121 has two sub-areas, namely a first sub-area and a second sub-area. The first sub-area is configured to scatter the red light in the second light and guide the same to exit, and the second sub-area is configured to scatter the green light in the second light and guide the same to exit. The first optical splitter 120 may enable the red light and the green light included in the second light emitted by the second light source 112 to exit in timing sequence, so that the light source system is adapted to the design of one light modulator. When the second light source 112 includes a red light source and a green light source, on the basis of the above embodiments, the timing sequence of turning on the red light and the green light in the second light source 112 can also be controlled to enable the red light and green light to exit in timing sequence, so that one light modulator can modulate the red light and the green light in timing sequence. When the light source system corresponds to one light modulator, the wavelength conversion device 150 may adopt the structure in this embodiment to emit yellow fluorescence as the third light. Of course, the wavelength conversion device 150 may also adopt other structures. For example, the wavelength conversion device 150 may have a first wavelength conversion area and a second wavelength conversion area, and under excitation of the first light, first excited light and second excited light are generated, respectively, and the first excited light and the second excited light enter the light modulator in timing sequence for modulation.

In practical applications, the first light and the second light incident onto a boundary area, which is located a diving line between the first area 121 and the second area 122 of the first optical splitter 120, have a very small light spot. In order to ensure the luminous efficacy of the light source system 100, an opening formed by the boundary area and a center of the disc may be made small according to actual requirements. In this embodiment, the first light emitted by the first light source 111 and the second light emitted by the second light source 112 are incident onto the first optical splitter 120 at an angle of 45 degrees, respectively.

Referring to FIG. 4, since it is difficult to achieve 100% of transmittance in an actual process for the incident light with a large incident angle that passes the scattering surface, when the second light is incident on the second surface 120b in the first area 121, a small part of the second light is reflected on the second surface 120b, and the remaining part of the second light is reflected on the first surface 120a after passing through the second surface 120b, then this part of the second light that is reflected by the first surface 120a passes through the second surface 120b to exit, meanwhile, still a small part of the second light is again reflected by the second surface 120b to the first surface 120a, and so on. Finally, the second surface 120b of the first optical splitter 120 can emit multiple beams of second light. By calculation, the first three beams of second light accounts for about 99% of overall energy, and one beam of the first three beams of second light is a part of the second light that is incident onto the first surface 120a and is reflected and then passes through the second surface 120b, and this one beam of second light accounts for most of the energy of the incident second light. Further, the reaming two beams of second light are obtained by the second light being reflected by the second surface 120b. Then, the energy of each beam of second light obtained by the second light being reflected by the second surface 120b gradually decreases. Therefore, among the multiple beams of second light emitted from the second surface 120b, each beam with a relatively large energy can be utilized, thereby improving the luminous efficacy of the second light emitted from the second surface 120b of the first optical splitter 120. In addition, since the second light passes through the second surface 120b (scattering surface) of the first optical splitter 120 twice, it is beneficial to spot elimination for the second light (yellow laser).

The light source system 100 further includes a control device that is electrically connected to the first optical splitter 120 to control the first driving unit to drive the first area 121 and the second area 122 of the first optical splitter 120 to move periodically, so that the first area 121 and the second area 122 are periodically located on the light paths of the first light and the second light. In addition, the control device is also electrically connected to the first light source 111 and the second light source 112, so that when the first area 121 moves to a preset light path, the control device controls the first light source 111 and the second light source 112 to emit the first light and the second light; and when the second area 122 moves to a preset light path, the control device controls the first light source 111 to emit the first light.

Referring back to FIG. 2, the wavelength conversion device 150 is configured to perform a wavelength conversion on the first light emitted from the first optical splitter 120 to obtain third light. In this embodiment, the wavelength conversion device 150 is a color wheel. In this embodiment, the wavelength conversion device 150 is coated with yellow phosphor. When the first area 121 of the first optical splitter 120 is located on the light path of the first light, the first light emitted from the first surface 120a in the area 121 is incident onto the wavelength conversion device 150, thereby exciting the yellow phosphor to generate yellow fluorescence as the third light.

In this embodiment, the wavelength conversion device 150 further includes a second driving unit, and the control device is further configured to control the second driving unit to drive the wavelength conversion device 150, so that the second drive unit rotates to achieve a purpose of heat dissipation, thereby avoiding a reduction of the fluorescence conversion efficiency of the phosphor due to heat accumulation. In other embodiments, the wavelength conversion device 150 may be coated with phosphors of other colors, such as red, green, blue, orange, etc., and the wavelength conversion device 150 may include one section, two sections, three sections, or four sections etc., which can be selected according to actual cases. For example, when the wavelength conversion device includes only one section, yellow phosphor or orange phosphor may be provided thereon; when the wavelength conversion device includes two sections, one section may be provided thereon with red phosphor and the other section may be provided thereon with green phosphor, or one section may be provided thereon with yellow phosphor and the other section may be proved thereon with green phosphor; and when the wavelength conversion device 150 includes two or more sections, the control device controls the light source to be turned off at a boundary between two adjacent sections, thereby avoiding light of two colors at the boundary.

Figure 6:
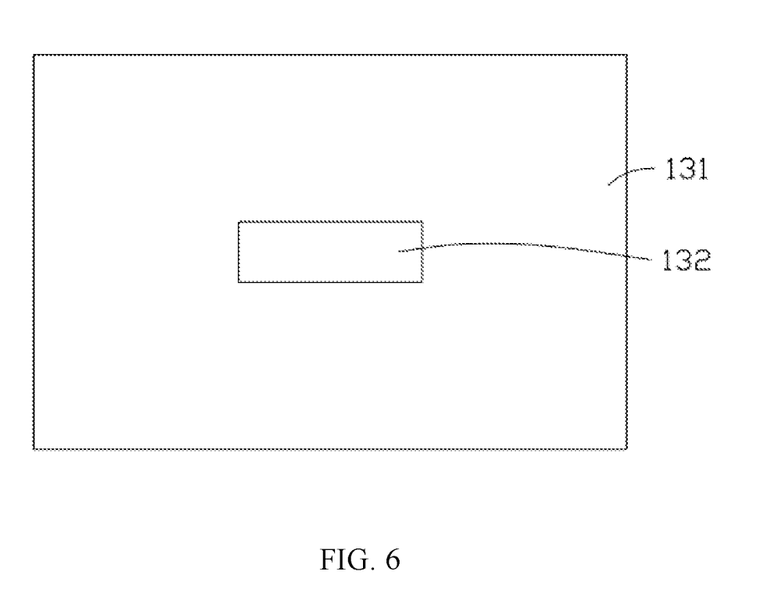
FIG. 6 is a schematic structure diagram of a front of a first light combining device in the light source system according to the first embodiment of the present disclosure.
Figure 7:
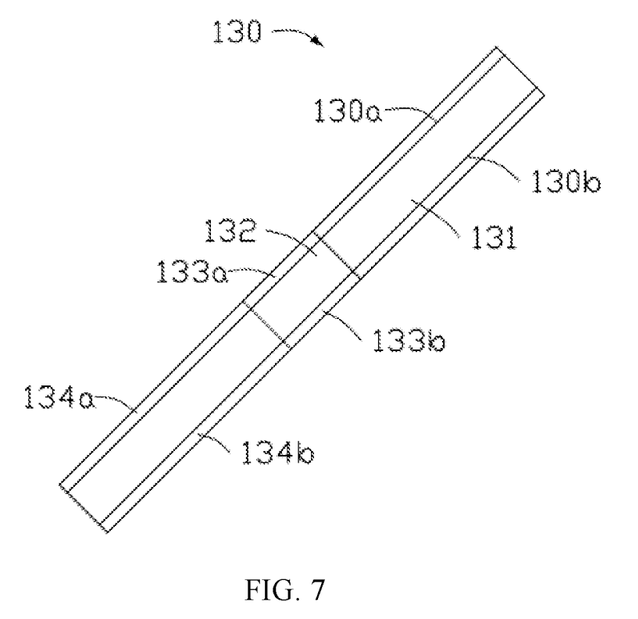
FIG. 7 is a schematic cross-sectional structure diagram of the first light combining device in the light source system according to the first embodiment of the present disclosure.

Referring to FIG. 2, FIG. 6 and FIG. 7, the light source system 100 further includes a first light combining device 130, which has a third area 131 and a fourth area 132 that are arranged adjacent to each other. In this embodiment, the third area 131 surrounds the fourth area 132. The third area 131 is configured to transmit the third light generated by the wavelength conversion device 150, and the fourth area 132 is configured to guide the first light emitted from the first optical splitter 120, the second light and the third light to exit along a same light path. Specifically, the first light combining device 130 has a third surface 130a and a fourth surface 130b that are opposite to each other. The third surface 130a and the fourth surface 130b in the third area 131 are provided with an anti-reflection film 134a and an anti-reflection film 134b, respectively. The fourth surface 130b in the fourth area 132 is provided with a high-reflection film 133b. The third light emitted from the wavelength conversion device 150 passes through the anti-reflection film 134a, the third surface 130a, the fourth surface 130b, and the anti-reflection film 134b in the third area 131 to exit. The first light and the second light subsequently emitted from the first splitting device 120 are reflected by the high-reflection film 133b on the fourth surface 130b in the fourth area 132 to exit, and is then combined with the third light that exits from the third area 131 to form illumination light. In one implementation manner, the third surface 130a in the fourth area 132 is provided with a high-reflection film 133a for further reflecting a small part of the first light and the second light that passes through the fourth surface 130b in the fourth area 132.

In an embodiment, the fourth area 132 of the first light combining device 130 may be configured to transmit the second light emitted by the second light source 112, and the third area 131 may be configured to reflect the third light emitted from the wavelength conversion device 150. The second light transmitted by the first light combining device 130 and the third light reflected by the first light combining device 130 are combined to exit. Referring to FIG. 2 again, in this embodiment, the first light emitted from the first surface 120a of the first optical splitter 120 is incident onto the homogenizing element 220 for homogenization. The homogenizing element 220 may be an optical bar, a fly-eye or a diffuser. The homogenized first light is guided by the reflective element 231 to a relay lens 213, and the first light is compensated by the relay lens 213 and then enters a dichroic filter 140. In other embodiments, the homogenizing element 220, the reflective element 231, and the relay lens 213 can be removed according to actual needs.

The light source system 100 further includes a dichroic filter 140 disposed between the wavelength conversion device 150 and the first light combining device 130, and the dichroic filter 140 is configured to transmit the third light (yellow fluorescence) generated by the wavelength conversion device 150 and to reflect the unabsorbed first light (blue laser) doped in the third light. In the actual process, the reflectivity of the dichroic filter 140 to blue laser may reach 99% or above, thus the blue laser emitted from the dichroic filter 140 has little effect on the chromaticity coordinates of the yellow fluorescence. The yellow fluorescence generated by the wavelength conversion device 150 is collected by a light collecting component 151 and is then projected to the dichroic filter 140. After passing through the dichroic filter 140, the yellow fluorescence forms an intermediate image A in a plane where the first light combining device 130 is located. The yellow fluorescence passes through the third area 131 of the first light combining device 130, and the second light (yellow laser) emitted from the second surface 120b of the first optical splitter 120 passes the relay lens 211 and the relay lens 212 and is then combined with the yellow fluorescence emitted from the first light combining device 130.

Figure 8:
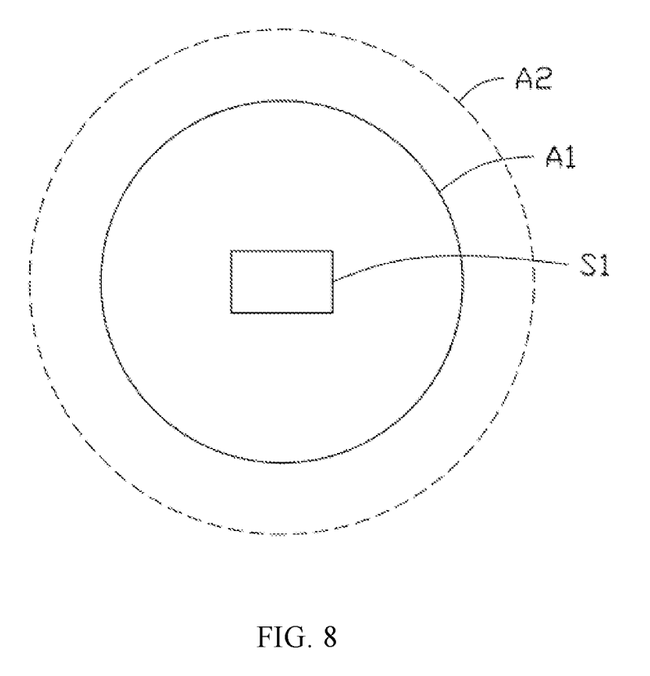
FIG. 8 is a schematic diagram of a light spot that can be received by any virtual imaging plane on a light-exiting path of the fluorescent light emitted from the first light combining device in the light source system according to the first embodiment of the present disclosure.

Referring to FIG. 8, a block area corresponding to an area S1 without fluorescence shown in the figure is formed by shielding of the fluorescence by the fourth area 132 of the first light combining device 130, and this block area corresponds to a distribution area of the second light. When the light spot of the fluorescence emitted from the first light combining device 130 that is received on any virtual imaging plane extends within a dividing line A1 with a smaller radius, a distribution area corresponding to an optical extension amount of the fluorescence is an area surrounded by the dividing line A1 in addition to the area S1; and when the light spot extends within a dividing line A2 with a larger radius, a distribution area corresponding to an optical extension amount of the fluorescence is an area surrounded by the dividing line A2 in addition to the area S1, in this case, light loss of the fluorescence after passing through the first light combining device 130 is reduced. It can be understood that, when the surface distribution corresponding to the optical extension amount of the fluorescence at the intermediate image A increases, the fluorescence loss caused by the third light being shielded by the fourth area 132 when passing through the first light combining device 130 may be reduced. Therefore, when designing the light path of the third light, the surface distribution and angular distribution of the yellow fluorescent projected to the intermediate image A are allowed to have a certain degree of dilution of the optical extension amount, so that the third light and the second light are combined in the optical extension amount to reduce the loss of the third light, thereby improving the luminous efficacy of the third light.

The light source system 100 further includes a light homogenizing component 160, which is configured to homogenize the illumination light, which is formed by combining the third light, the first light and the second light that are emitted from the first light combining device 130, and the homogenized illumination light exits from the light source system 100. In this embodiment, the light homogenizing component 160 includes a relay lens 161 and a fly-eye 162. The yellow fluorescence, yellow laser, and blue laser emitted from the first light combining device 130 are combined and then incident to the fly-eye 162 via the relay lens 161. In practical applications, the device selection and parameter selection of the relay lens 161 may also be optimized to ensure that the optical extension amount that is incident to the fly-eye 162 is well conserved.

It can be understood that, when the first area 121 of the first optical splitter 120 is located on the light paths of the first light and the second light, the yellow fluorescence generated by excitation of the first light is combined with the second light (yellow laser). As compared with the light source system using only the first light source 111, the addition of the second light source 112 may correct a proportion of red light and green light in the light beam emitted from the light source system 100, thereby being beneficial to improvement of the color purity of red light and green light and expansion of the color gamut of the displayed image formed by the light beam emitted from the light source system 100; and when the second area 122 of the first optical splitter 120 is located on the light path of the first light, the blue laser generated by the first light source 111 passes a rotating second surface 120b (scattering surface) of the first optical splitter 120 to exit, thereby having a better effect in terms of spot elimination than a case of a stationary scattering surface. When the periodic movement of the first area 121 and the second area 122 of the first optical splitter 120 is fast enough, due to a phenomenon of persistence of vision in human eyes (i.e., the vision generated by the light entering the human eye remains for a period of time after the light stops acting), the human eyes can receive the illumination light combined by the yellow fluorescent, yellow laser and blue laser that are sequentially emitted from the light source system 100 combined in timing sequence.

Second Embodiment

Figure 9:
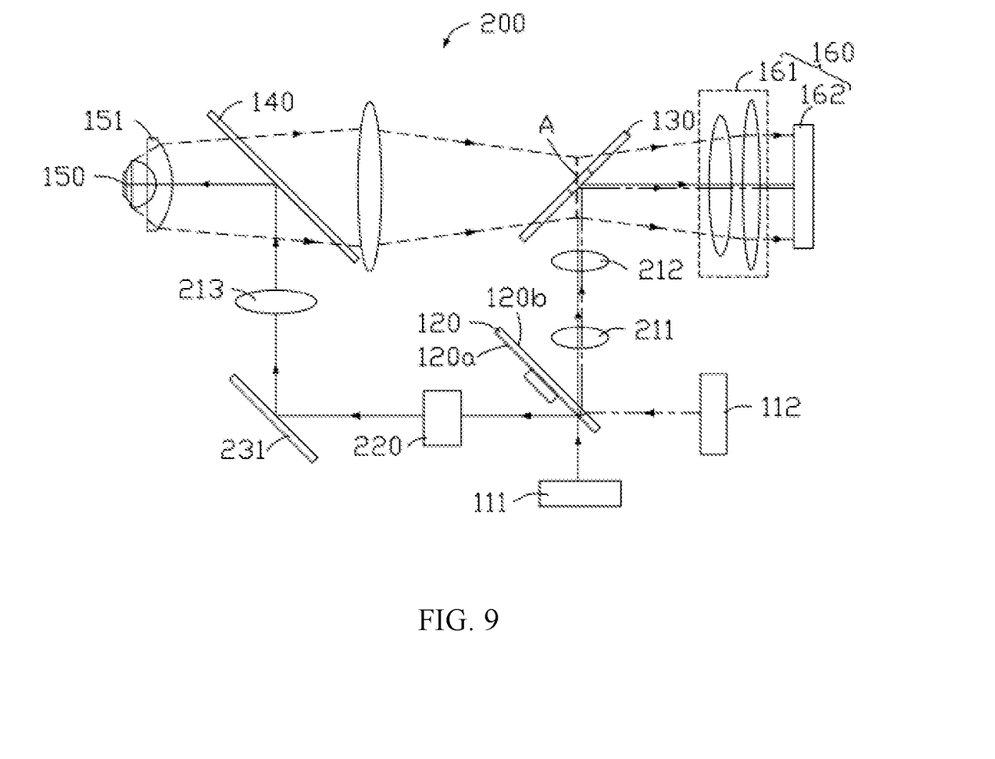
FIG. 9 is a schematic structure diagram of a light source system according to a second embodiment of the present disclosure.

Referring to FIG. 9, the light source system 200 according to the second embodiment of the present disclosure differs from the light source system 100 in that the wavelength conversion device 150 may be a fixed phosphor plate, such as a yellow fluorescent phosphor plate using inorganic materials (such as ceramics), thereby being beneficial to a reduction of a volume of the light source system 200 under a premise of withstanding a high temperature.

Third Embodiment

Figure 10:
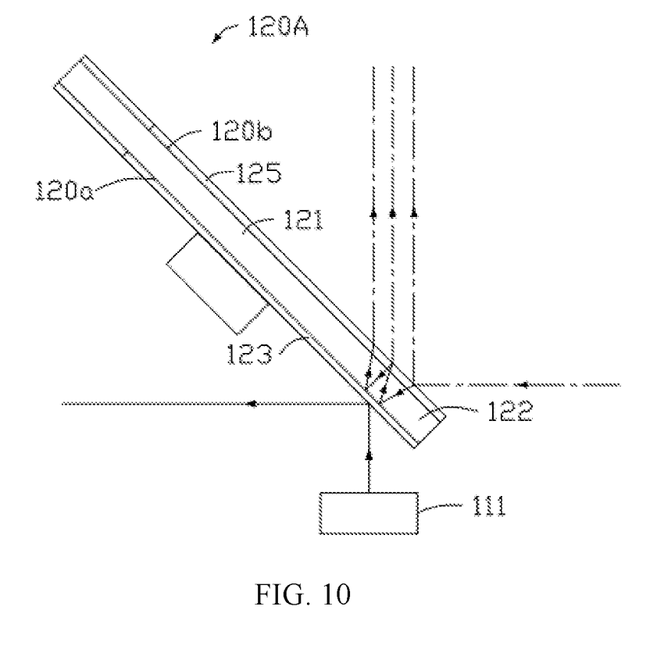
FIG. 10 is a schematic cross-sectional structure diagram of a first area of a first optical splitter of the light source system according to a third embodiment of the present disclosure.

Referring to FIG. 10, a first optical splitter 120A according to the third embodiment of the present disclosure differs from the first optical splitter 120 in that the second surface 120b in the first area 121 of the first optical splitter 120A is coated with a light splitting film 125 which is configured to reflect the blue laser and transmit the yellow laser, so that the second surface 120b in the first area 121 of the first optical splitter 120A reflects the first light emitted by the first light source 111, thereby being beneficial to a reduction of an influence of the first light passing through the first area 121 on the chromaticity coordinates of the second light emitted from the first area 121.

In the actual application process, when the first light emitted by the first light source 111 is incident onto the first surface 120a (polished surface) and is reflected, a small part of first light will pass through the first optical splitter 120A, for example, the high-reflection film 123 on the first surface 120a has a reflectivity of about 98.5% to first light, and about 1.5% of blue laser will pass through the first optical splitter 120A. However, since the x and y values of the blue laser coordinates in the color gamut diagram are small, 1.5% of the blue laser has a greater effect on the chromaticity coordinates of the second light emitted from the first optical splitter 120A at the same time, which may result in a chromaticity coordinate deviation of about 0.08 that far exceeds a tolerance range of the DCI color gamut standard, and thus this affects a displaying quality of the light beam emitted by the light source system 100. The light source system 300 provided in this embodiment is beneficial to reduction of an influence of the blue laser on the chromaticity coordinates of the yellow laser.

Fourth Embodiment

Figure 11:
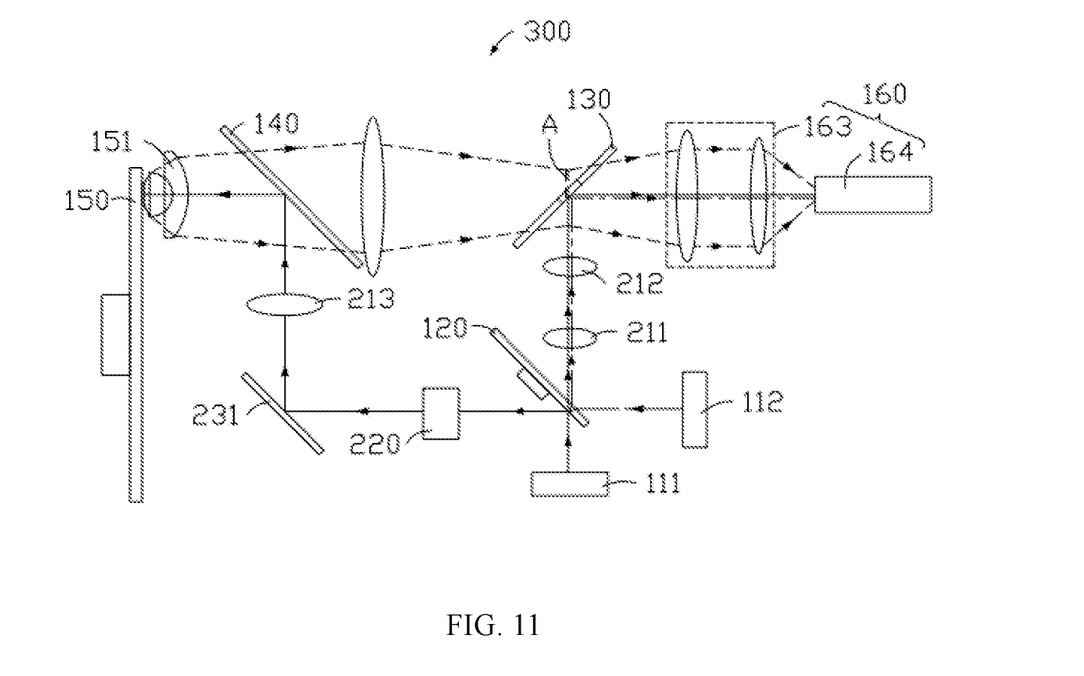
FIG. 11 is a schematic structure diagram of a light source system according to a fourth embodiment of the present disclosure.

Referring to FIG. 11, a light source system 300 according to the fourth embodiment of the present disclosure differs from the light source system 100 in that the light homogenizing component 160 includes a lens group 163 and an optical bar 164, and the yellow fluorescence, the yellow laser and the blue laser emitted from the first light combining device 130 are combined and then converged by the lens group 163 to enter the optical bar 164 for light homogenization.

Fifth Embodiment

Figure 12:
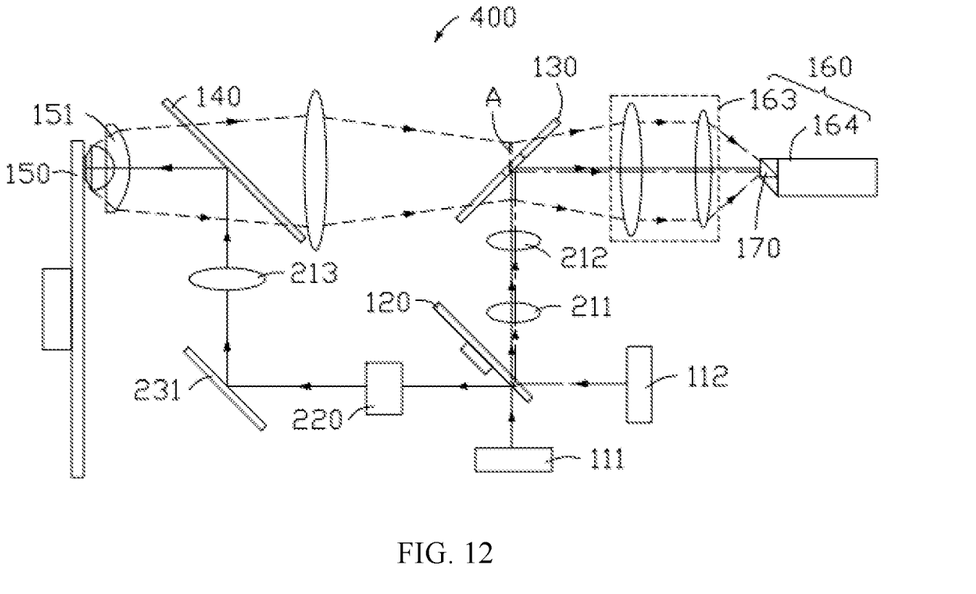
FIG. 12 is a schematic structure diagram of a light source system according to a fifth embodiment of the present disclosure.

Referring to FIG. 12, a light source system 400 according to the fifth embodiment of the present disclosure differs from the light source system 300 in that the light source system 400 further includes a polarizing device 170, which may be arranged on a light-exiting path of the illumination light to convert the incident first light, second light, and third light into a light beam with one or two polarization states, thereby forming the illumination light. In this embodiment, the polarization device 170 is a polarization optical splitter (PBS), which is arranged at a light entrance of the optical bar to convert yellow fluorescent with a non-polarization state emitted from the first light combining device 130 into two linearly polarized light beams whose propagation directions are perpendicular to each other. Since the PBS has a better polarization splitting effect in parallel light paths or converged light paths with a smaller converged angle, this embodiment is more suitable for illumination light paths with a smaller converged angle. It can be understood that in other embodiments, the polarization device 170 may also be, for example, a polarization conversion system (PCS) for converting the incident illumination light into a light beam with one polarization state, thereby being beneficial to an increase of utilization of the illumination light. This embodiment can be applied to 3D display.

Sixth Embodiment

Figure 13:
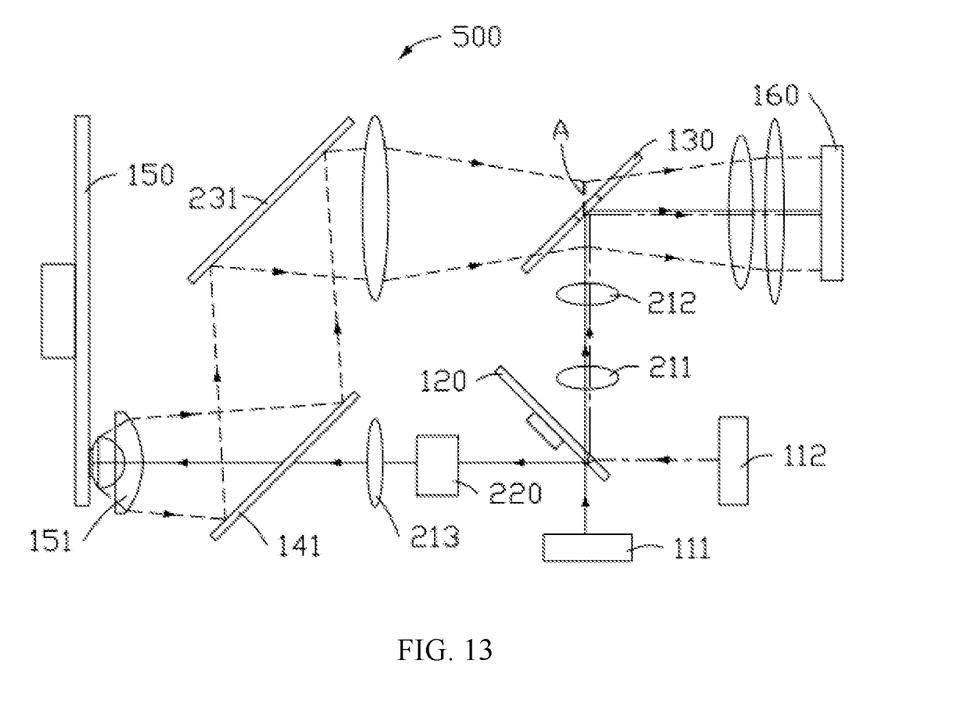
FIG. 13 is a schematic structure diagram of a light source system according to a sixth embodiment of the present disclosure.

Referring to FIG. 13, the light source system 500 according to the sixth embodiment of the present disclosure differs from the light source system 100 in that the dichroic filter 141 is arranged on a light-exiting path of the first optical splitter 120, and is also arranged on an light-incoming path and a light-exiting path of the wavelength conversion device 150, to transmit the first light emitted from the first optical splitter 120 and reflect the third light generated by the wavelength conversion device 150. The first light reflected by the first surface 120a of the first optical splitter 120 passes through the homogenizing element 220 and the relay lens 213 and then passes through the dichroic filter 141, and the blue laser that passes through the dichroic filter 141 is incident onto the wavelength conversion device 150 to excite to generate the yellow fluorescence. After being reflected by the dichroic filter 141, the generated yellow fluorescence is guided by the reflective element 231 and a light-converging lens to the first light combining device 130.

Figure 14:
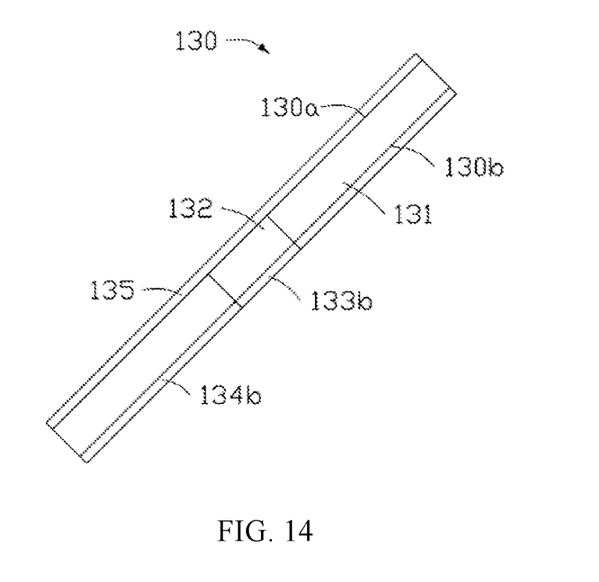
FIG. 14 is a schematic cross-sectional structure diagram of a first light combining device of the light source system according to the sixth embodiment of the present disclosure.

Referring to FIG. 14, in this embodiment, the third surface 130a in the third area 131 of the first light combining device 130 is coated with a light splitting film 135 for transmitting the third light and reflecting the first light doped in the third light. After the yellow fluorescent emitted from the dichroic filter 141 is incident onto the first light combining device 130, the third area 131 of the first light combining device 130 transmits the yellow fluorescent and reflects the blue laser light doped in the yellow fluorescence light that is not absorbed, thereby being beneficial to avoiding an influence of the blue laser light that is not absorbed by the phosphor on the chromaticity coordinates of the yellow fluorescence. Compared with the case in which the yellow fluorescence passes through the dichroic filter 140 and then is incident to the first light combining device 130 in the first embodiment, the case in which the yellow fluorescent is reflected by the dichroic filter 141 and then incident to the first light combining device 130 in this embodiment can improve a luminous efficacy of the yellow fluorescent, because a reflectivity of the film to the yellow fluorescence may be higher than a transmittance of the film to the yellow fluorescence in actual applications.

Seventh Embodiment

Figure 15:
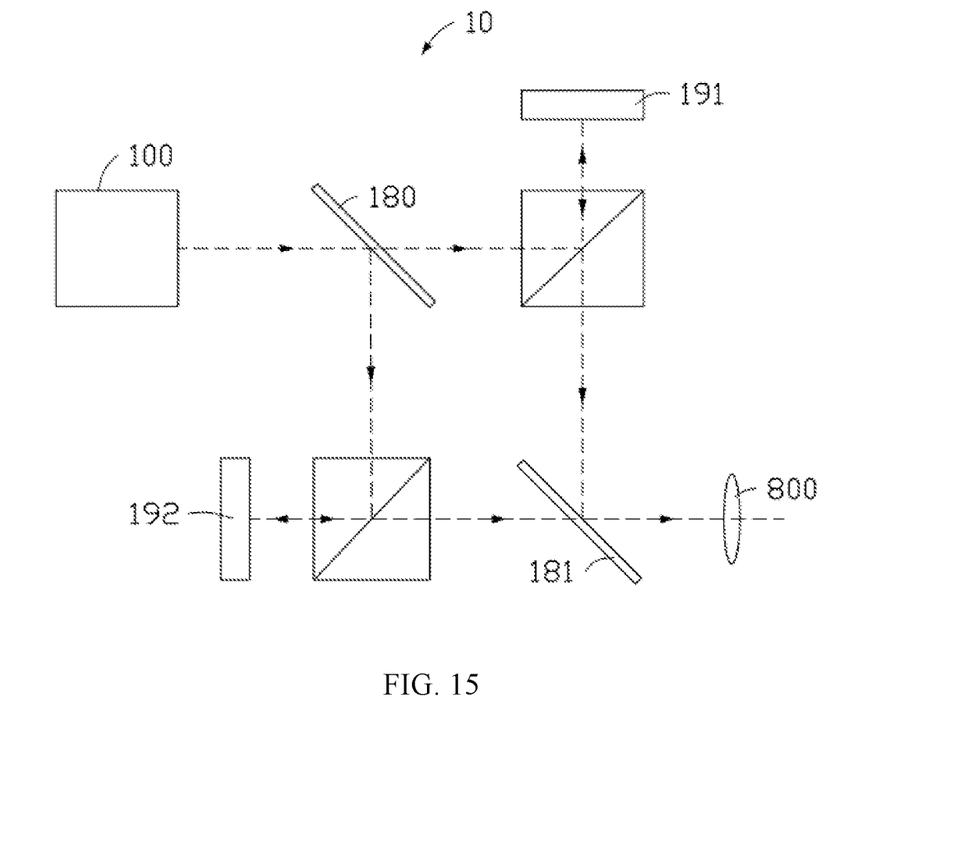
FIG. 15 is a schematic structure diagram of a display device according to a seventh embodiment of the present disclosure.

Referring to FIG. 15, a seventh embodiment of the present disclosure provides a display device 10 including any one of the above-mentioned light source systems. Taking the display device 10 as a two-chip DMD projector as an example, the display device 10 further includes a second optical splitter 180, which is configured to split the illumination light emitted by the light source system 100 to obtain fourth light and fifth light. In this embodiment, the yellow laser and the yellow fluorescence emitted by the light source system 100 are split by a second optical splitter to obtain red light and green light. The display device 10 further includes a first light modulation device 191 and a second light modulation device 192. In this embodiment, the first light modulation device 191 and the second light modulation device 192 are DMD chips, and the first light modulation device 191 and the second light modulation device 192 are configured to modulate the red light and the green light emitted from the second optical splitter 180 to obtain second modulated light and third modulated light. At least one of the first light modulation device 191 and the second light modulation device 192 modulates the first light emitted by the light source system 100 to obtain first modulated light. The first modulated light, the second modulated light, and the third modulated light are combined by the second light combining device 181 and then projected from a projection lens 800 to form a modulated image.

In an embodiment, the light source system as described in the first embodiment to the sixth embodiment can be applied to a single-chip projector. In this case, the second surface 121b in the first area 121 in the first optical splitter 120 has a red light area and a green light area. When the red light area is located on the light path of the second light, the second light source 112 emits a red laser as supplementary light; and when the green light area is located on the light path of the second light, the second light source 112 emits a green laser as supplementary light. The red supplementary light and the green supplementary light are successively reflected by the second surface 121b in the first area 121 and the second surface 120b of the first light combining device 130 and then exit in timing sequence from the light source system 100 along with the illumination light, so as to enter a same light modulator in timing sequence for modulation.

In an embodiment, the light source system described in the first embodiment to the sixth embodiment 6 may be applied to a three-chip DMD projector. In this case, the display device 10 further includes a third light modulation device (not shown), and the yellow light emitted from a light source system 100 is split to obtain red light and green light. The red light, green light and blue light enter the first light modulation device 191, the second light modulation device 192, and the third light modulation device for modulation, respectively.

In the related art, the two-chip DMD projection system usually has a scattering area at the wavelength conversion device 150, so that the first light source 111 directly passes through the scattering area of the wavelength conversion device 150 to obtain blue laser emitted by the light source system 100. Compared with the related art, in the display device 10 according to the embodiments of the present disclosure, the first light emitted by the first light source 111 does not need to pass through the wavelength conversion device 150 to be split, but rather is transmitted and reflected in different areas of the first optical splitter 120 to form two light paths. The first light may be directly used as component light of the illumination light after spot elimination by means of the first optical splitter 120, thereby reducing the optical loss caused by the first light passing through the wavelength conversion device 150 in the traditional technology, improving the luminous efficacy of the first light (blue light), and being beneficial to solving the problem of insufficient blue light in the dual-chip DMD projection system.

In the light source system according to the present disclosure, the second light emitted by the second light source 112 and the third light generated by the wavelength conversion device 150 are combined by the first light combining device 130, thereby being beneficial to correction of the color purity and proportion of each primary color light contained in the illumination light and expansion of the color gamut of the illumination light.

It should be noted that, within a scope of features of the present disclosure, the implementation of the light source system 100 in the first embodiment can also be applied to the second embodiment to the seventh embodiment accordingly, and in order to save space and to avoid repetition, no further details are described herein.

In the light source system and the display device according to the present disclosure, the first light emitted by the first light source is split in timing sequence by the first optical splitter, so that the first light serves as illumination light, and the incident light of the wavelength conversion device to excite and generate third light forming the illumination light, thereby improving a luminous efficacy of the light source system and the display device, and the second light emitted by the second light source expands a color gamut of a projection system. The first light may be directly emitted as the illumination light after being split by the first light splitting device and being homogenized when being used as the illumination light, a light path thereof is short. Compared with the traditional technology, splitting the light and eliminating the spot by the wavelength conversion device is not required, thereby reducing the loss in light propagation path; the second light enters the first optical splitter, which is the same one that the first light enters, for guidance and homogenization, thereby resulting in a more compact light path and as few optical components of the light source system as possible.

For those skilled in the art, it is obvious that the present disclosure is not limited to the details of the above exemplary embodiments, and the present disclosure can be implemented in other specific forms without departing from the essential features of the present disclosure. Therefore, from any point of view, all embodiments shall be considered exemplary and non-limiting. The scope of the present disclosure is defined by the appended claims rather than the above description, and therefore all modifications falling within the meaning and scope of the equivalent elements of the claims are included in the present disclosure. Any reference sign in the claims shall not be regarded as limiting the claims involved. In addition, it is obvious that the term "including/comprising" does not exclude other elements or steps, and the singular does not exclude the plural. Multiple devices stated in the device claims may also be implemented by one device or system by means of a software or hardware. Terms such as "first" and "second" are used to denote names, rather than denoting any specific order.

Finally, it should be noted that the above embodiments are merely used to illustrate the technical solutions of the present disclosure, but not to limit thereto. Although the present disclosure has been described in detail with reference to the preferred embodiments, those skilled in the art should understand that the technical solutions of the present disclosure may be modified or equivalently replaced without departing from the scope of the technical solutions of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A light source system, comprising:
a first light source configured to emit first light;
a second light source configured to emit second light;
a wavelength conversion device configured to perform a wavelength conversion on the first light to obtain third light;
a first optical splitter having a first area and a second area; and
a first light combining device, wherein the first optical splitter moves in timing sequence to make the first area and the second area be sequentially located on a preset light path, wherein the first area is configured to guide the first light to the wavelength conversion device and guide the second light to a first light combining device, the second area is configured to guide the first light to the first light combining device, wherein a side surface of the first optical splitter is configured to homogenize the first light and the second light that are emitted to the first light combining device; and
the first light combining device is configured to guide the first light emitted from the second area, the second light emitted from the first area, and the third light emitted from the wavelength conversion device to exit along a same light path to form illumination light.

2. The light source system according to claim 1, wherein the first optical splitter comprises a first surface and a second surface that are opposite to each other, the first surface being a polished surface, and the second surface being a scattering surface.

3. The light source system according to claim 2, wherein the first surface in the first area is provided with a high-reflection film, and wherein the second surface in the first area is provided with an anti-reflection film or with a light splitting film for reflecting the first light and transmitting the second light, and wherein each of the first surface and the second surface in the second area is provided with an anti-reflection film.

4. The light source system according to claim 1, further comprising a polarizing device, wherein the polarizing device is arranged on a light-exiting path of the illumination light, and is configured to convert the first light, the second light and the third light which are incident therein into light with one or two polarization states.

5. The light source system according to claim 1, wherein the first light combining device has a third area and a fourth area surrounded by the third area, the third area being configured to guide the third light emitted from the wavelength conversion device to exit, and the fourth area being configured to guide the first light and the second light, that are emitted from the first optical splitter, and the third light emitted from the third area to exit along a same light path, to form the illumination light.

6. The light source system according to claim 5, wherein the first light combining device comprises a third surface and a fourth surface that are opposite to each other, the third surface in the third area being provided with an anti-reflection film or with a light splitting film for transmitting the third light and reflecting the first light, the fourth surface in the third area being provided with an anti-reflection film, and the fourth surface in the fourth area being provided with a high-reflection film.

7. The light source system according to claim 1, further comprising a dichroic filter, wherein the dichroic filter is configured to guide the third light emitted by the wavelength conversion device to the first light combining device and guide the first light emitted from the wavelength conversion device to reenter the wavelength conversion device, or
the dichroic filter is configured to guide the first light emitted from the first optical splitter to the wavelength conversion device and guide the third light to the first light combining device.

8. The light source system according to claim 1, further comprising a light homogenizing component, wherein the light homogenizing component is configured to homogenize the illumination light, and homogenized illumination light exits from the light source system.

9. The light source system according to claim 8, wherein the light homogenizing component comprises a relay lens and a fly-eye, or comprises a lens group and an optical bar.

10. The light source system according to claim 1, wherein the wavelength conversion device is a color wheel or a fixed phosphor plate.

11. The light source system according to claim 1, further comprising a control device, wherein the control device is electrically connected to both the first light source and the second light source, wherein the control device controls the first light source and the second light source to respectively emit the first light and the second light when the first area of the first optical splitter moves to the preset light path, and controls only the first light source to emit the first light when the second area moves to the preset light path.

12. A display device, comprising a light source system, wherein the light source system comprises:
a first light source configured to emit first light;
a second light source configured to emit second light;
a wavelength conversion device configured to perform a wavelength conversion on the first light to obtain third light;
a first optical splitter having a first area and a second area; and
a first light combining device,
wherein the first optical splitter moves in timing sequence to make the first area and the second area be sequentially located on a preset light path, wherein the first area is configured to guide the first light to the wavelength conversion device and guide the second light to a first light combining device, the second area is configured to guide the first light to the first light combining device, wherein a side surface of the first optical splitter is configured to homogenize the first light and the second light that are emitted to the first light combining device, and wherein the first light combining device is configured to guide the first light emitted from the second area, the second light emitted from the first area, and the third light emitted from the wavelength conversion device to exit along a same light path to form illumination light.

13. The display device according to claim 12, further comprising a second optical splitter, wherein the second optical splitter is configured to split the second light and the third light in the illumination light that are emitted by the light source system to obtain fourth light and fifth light when the first area is located on the preset light path, and to guide the first light in the illumination light to exit along a light path of the fourth light or a light path of the fifth light when the second area is located on the preset light path.

14. The display device according to claim 13, further comprising a first light modulation device and a second light modulation device, wherein the first light modulation device and the second light modulation device are configured to modulate the fourth light and the fifth light to obtain second modulated light and third modulated light, respectively; the first light emitted by the light source system is modulated by at least one of the first light modulation device or the second light modulation device to obtain first modulated light; and the first modulated light, the second modulated light, and the third modulated light are combined to form a modulated image.

* * * * *